United States Patent
Andreev et al.

(10) Patent No.: US 6,564,211 B1
(45) Date of Patent: May 13, 2003

(54) FAST FLEXIBLE SEARCH ENGINE FOR LONGEST PREFIX MATCH

(75) Inventors: Alexander E. Andreev, San Jose, CA (US); Ranko Scepanovic, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 310 days.

(21) Appl. No.: 09/679,209

(22) Filed: Oct. 4, 2000

(51) Int. Cl.[7] .............................................. G06F 17/30
(52) U.S. Cl. ............................................... 707/3; 707/6
(58) Field of Search ................................. 707/1–5, 7, 8, 707/10, 100, 102, 200, 203, 206; 709/201, 202, 203, 223, 225, 236, 238, 245, 246, 247, 332; 711/108, 158, 206, 216, 217, 220

(56) References Cited

U.S. PATENT DOCUMENTS

| | | | | |
|---|---|---|---|---|
| 5,202,986 A | * | 4/1993 | Nickel | 707/3 |
| 6,141,738 A | * | 10/2000 | Munter et al. | 711/206 |
| 6,243,720 B1 | * | 6/2001 | Munter et al. | 707/206 |
| 6,421,660 B1 | * | 7/2002 | Glaise | 707/3 |

OTHER PUBLICATIONS

M.V. Ramakriskna, "Hashing in Practice, Analysis of Hashing and Universal Hashing", Proceedings of the Conference on Management of Data, Association for Computing Machinery, 1988, pp 191–199.

T.H. Cormen et al., "Introduction to Algorithms", The MIT Press, McGraw Hill Book Company, 1989, Chapter 14 "Red–Black Trees", pp 263–280.

V. Srinivasan et al., "Fast Address Lookups Using Controlled Prefix Expansion", ACM Proceedings of Computer Systems, vol. 17, No. 1, Feb. 1999, pp 1–40.

* cited by examiner

Primary Examiner—Kim Vu
Assistant Examiner—Fred Ehichioya
(74) Attorney, Agent, or Firm—Westman, Champlin & Kelly

(57) ABSTRACT

A subprefix is selected from a prefix search tree that has a longest match to a search prefix. A binary search prefix is input to the root vertex of the tree, and is compared to the prefixes in selected hierarchy vertices. A bit is set in a search mask based on a least significant bit of a bit string in the search prefix that matches a longest bit string in a prefix in each vertex. A longest matching subprefix is selected from a string of most significant bits of the search prefix based on the lowest significant bit set in the search mask. A prefix mask is also provided for each prefix in the tree, and is useful in connection with construction of the search mask.

20 Claims, 2 Drawing Sheets

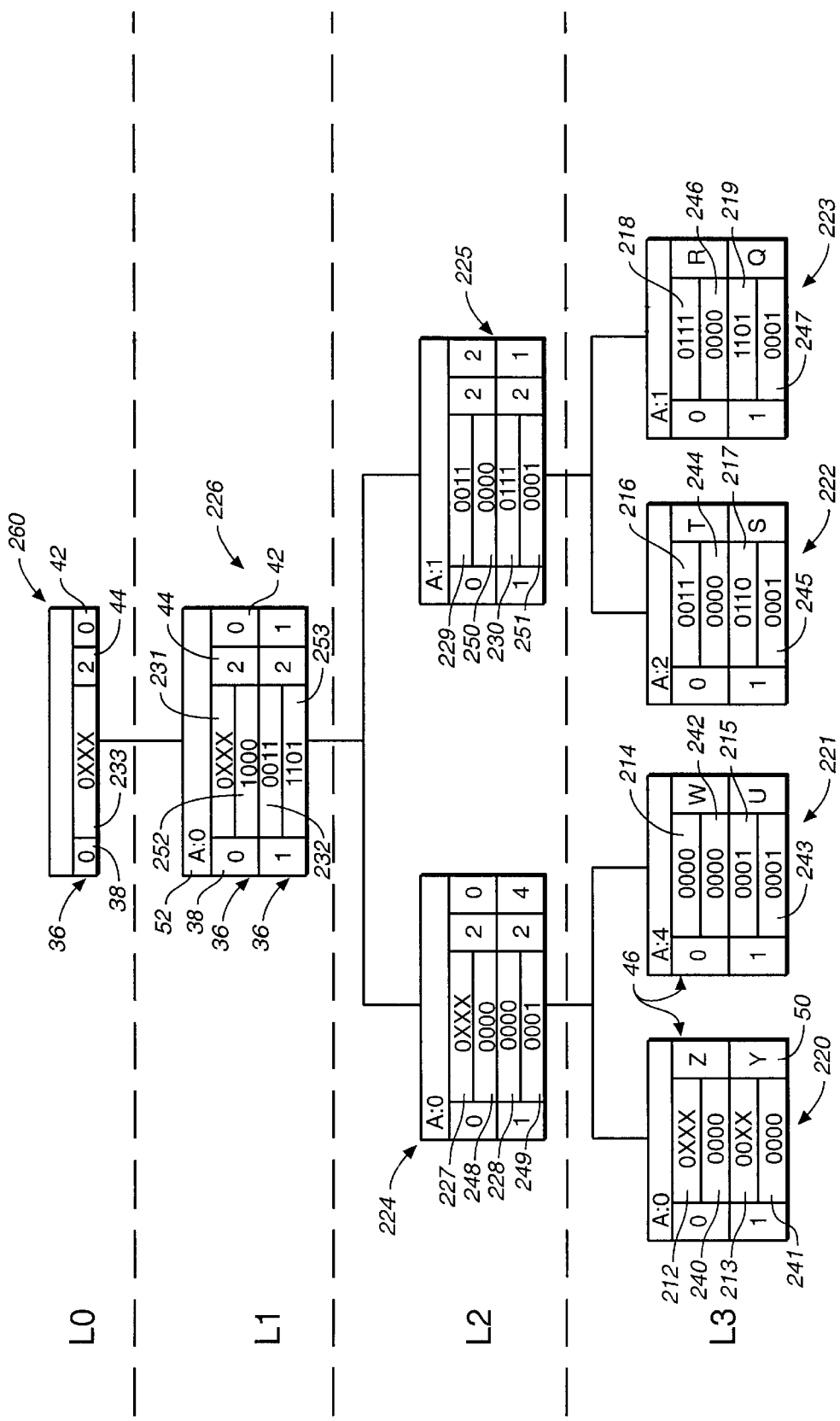
FIG._1

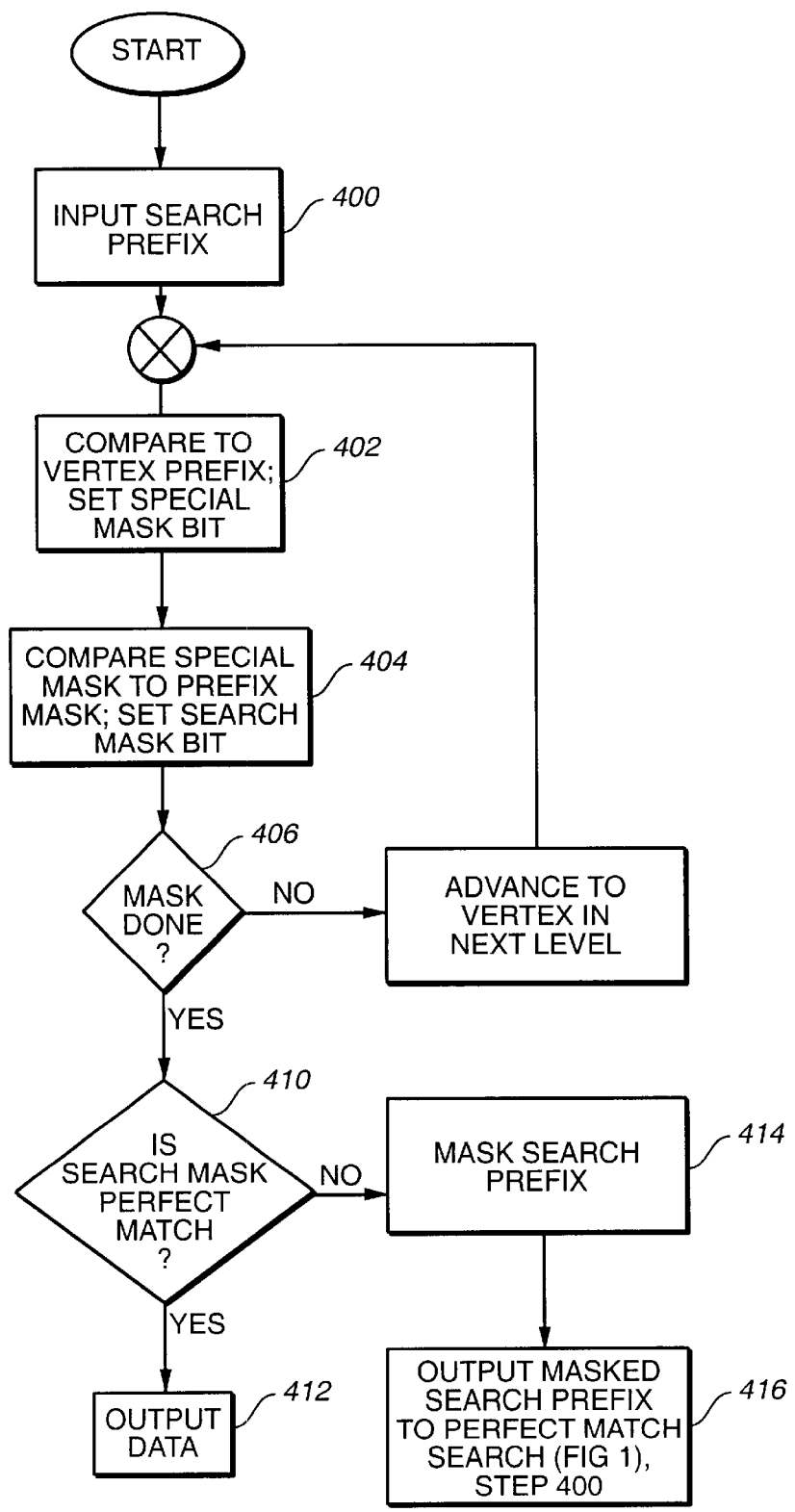
FIG._2

FAST FLEXIBLE SEARCH ENGINE FOR LONGEST PREFIX MATCH

CROSS-REFERENCE TO RELATED APPLICATIONS

This application is related to application Ser. No. 09/679,313 filed Oct. 4, 2000 for "Flexible Search Engine Having Sorted Binary Search Tree For Perfect Match" by Alexander E. Andreev and Ranko Scepanovic and assigned to the same assignee as the present invention.

BACKGROUND OF THE INVENTION

This invention relates to search engines for searching large databases or tables of data, and particularly to fast flexible search engines employing longest prefix matching for lookup of prefixes and addresses.

Data communications is most often accomplished by sending a group of data in a packet, together with the address of the location for which the data are intended. Typically, a search for data is accomplished by conducting a binary search based on the address or prefix where the data are retained, or stored, and the data are returned in packets to the requesting address. The search is conducted by a lookup procedure that matches the query address with the stored address.

Lookup procedures are a major source of bottlenecks in high performance compilers and routers. Lookup techniques are used in various compilers such as compilers used in designing semiconductor and integrated circuit chips, and in networking applications such as Internet address (URL) lookup in high performance data routers where large search tables or databases are employed. Searching large tables or databases requires increased time or hardware requirements, or both, resulting in more expensive systems in terms of increased search delays and larger memories. Problems associated with such lookups increase with the size of the table or database, increases in address length, increases in traffic, and introduction of higher speed links. In Internet applications, this problem is expected to increase as the next generation IPv6 protocol (which uses 128-bit URL addresses) is introduced to supplement the current IPv4 (32-bit) protocol.

In our co-pending application Ser. No. 09/679,313, we describe a sorted binary search tree having a fixed number of levels, in which the bottom vertices or leaves contain keys and associated data. The hierarchy vertices or nodes contain one key for each child vertex (node or leaf) and a vertex address pointing to the vertex containing that key. The keys are arranged in a predetermined order, such as address order, across the vertices of each levels such that a search into a given hierarchy vertex (node) is directed into a specific group of keys. The search tree is structured so that all search paths are the same length. Nodes or vertices may be inserted and deleted at most levels, thereby maintaining the equal length to all search paths. The tree described in our aforementioned application also employs perfect matching techniques which seeks a perfect match between the input or query key and the key being sought. If a perfect match is not returned, the search reports a false return.

In some environments, longest prefix searching is used in conjunction with perfect matching to simplify the search procedure. Longest prefix searching involves finding the prefix of an address in the tree that contains the longest most significant string of bits matching a key of the input query. One example of a data structure using both longest prefix searching and perfect matching is Content Addressable Memory (CAM). However, CAM requires more memory than other data structures, and longest prefix searching requires external prefix sorting. External prefix sorting eliminates the dynamic editing features of the lookup table, decreases performance and increases external communication and control requirements.

There are difficulties with longest prefix searching. The prefixes may be any length, up to W−1, where W is the maximum length of an address. Since W=32 in IPv4 Protocol and W=128 in IPv6 Protocol, the prefix may be any length between 1 and 31 bits in IPv4 Protocol and between 1 and 127 bits in IPv6 Protocol. Thus, a vast number of variable-length prefixes exist in both IPv4 and IPv6 Protocols. The number of memory accesses required by traditional perfect match searching of variable-length prefixes increases with the number of prefixes. Consequently, the number of memory accesses can be large, thereby slowing the search process.

V. Srinivasan et al., in "Fast Address Lookups Using Controlled Prefix Expansion", ACM Transactions on Computer Systems, Vol 17, No. 1, February 1999, pp. 1–40, noted that worst case search delays are directly related to the number of distinct prefix lengths, and that faster searching could be accomplished by reducing the number of prefix lengths. Noting that current IPv4 Protocol results in 25 distinct prefix lengths between 8 and 32 bits, Srinivasan et al. proposed a system of controlled prefix expansion by selectively adding bits to shorter prefixes to thereby minimize the number of lengths of prefixes. In an example of seven prefix lengths, controlled expansion proposed by Srinivasan et al. resulted in a reduction to three prefix lengths. Principally, Srinivasan et al. added both a "1" and a "0" to a shorter prefix. If an existing prefix was duplicated by the expansion of a shorter prefix, only the non-conflicting expansion was employed. The result, however, was an expansion of the prefix table, with several expanded prefixes representing a single unexpanded prefix. Moreover, prefix insertion and deletion was complicated due to the need for non-duplication in the expansion.

The present invention is directed to an improvement of the search tree described in our aforementioned application, and particularly to a prefix search technique employing prefixes of a single length for faster searching.

SUMMARY OF THE INVENTION

In accordance with one aspect of the present invention, a process is provided for selecting a prefix in a collection that has a longest matching subprefix to a search prefix. A prefix search tree contains a plurality of vertices arranged in levels with each bottom vertex containing a plurality of binary prefixes and each hierarchy vertex containing a binary prefix from each child bottom vertices. A binary search prefix is input to the root vertex, and is compared to the prefixes in selected hierarchy vertices. A bit is set in a search mask based on a least significant bit of a bit string in the search prefix that matches a longest bit string in a prefix in each vertex. A longest matching subprefix is selected from a string of most significant bits of the search prefix based on the lowest significant bit set in the search mask.

One feature of the invention is that the longest matching subprefix is equal in bit length to the mask and to the prefixes in the tree. If the selected longest matching subprefix contains less than the prescribed number of bits, the subprefix is filled with empty bit positions.

In one embodiment of the invention, each prefix in the collection has an associated prefix mask that represents its common subprefixes in the collection. A special mask is constructed for each prefix in each vertex, the special mask being based on a comparison of the prefix in the vertex and the search prefix. The search mask is constructed based on a comparison of the special masks and the prefix masks. Thus, the search mask is based on the search prefix, the prefix in the vertex and the common subprefixes in the collection.

In accordance with the invention, if the longest matching subprefix matches a key in the collection, data associated with the key is output. If the longest matching subprefix does not exactly match a key in the collection, the longest matching subprefix is re-input to the search process to locate data associated with the longest matching subprefix in the collection.

One aspect of the invention resides in the arrangement of entries at each level in a predetermined order, such as in prefix value order. The search is conducted through the tree for the longest matching subprefix, and data associated with a prefix matching the longest matching subprefix are output.

Another aspect of the present invention resides in a process for creating the prefix mask for each prefix in each hierarchy and bottom vertex. Each prefix mask is based on the respective prefix and the vertex in which it is found.

The invention is carried out by a computer by embodying the invention in computer readable program code in a memory readable by the computer.

BRIEF DESCRIPTION OF THE DRAWINGS

FIG. 1 is a diagram of a binary search tree according to the presently preferred embodiment of the present invention.

FIG. 2 is a flow chart of the process of construction of masks for the prefixes in the prefix tree illustrated in FIG. 1.

DETAILED DESCRIPTION OF THE PREFERRED EMBODIMENTS

Conventional address prefixes are ordinarily some portion of the corresponding address. In IPv4 Protocol where the address is 32 bits, the prefixes are typically between 8 and 32 bits in length. Worst case search delays are directly related to the number of prefix lengths. Where prefixes vary in length between 8 and 32 bits, there are as many as 25 distinct prefix lengths, thereby increasing worst case search delays and making delay prediction unreliable. The present invention establishes a single length for all prefixes and subprefixes, equal to in length to the addresses (32 bit positions in IPv4 Protocol). Searches are accomplished using a prefix or subprefix derived from a binary search tree. A prefix or subprefix has the same number of bit positions as a key (e.g., 32 bit positions in IPv4 Protocol and 128 bit positions in IPv6 Protocol). In some cases, the prefixes are identical to the address; in other cases, some least significant bits in the prefix are empty (designated by "x"). Prefixes with empty bits are sometimes herein referred to as subprefixes. Thus, a prefix "1101110" contains subprefixes "110111x", "11011xx", etc.

Restating the example given by Srinivasan, supra, for the present invention, a flight database listing flights from London to the United States might list flights to a thousand U.S. cities. If most flights hub through Boston (Bo), except those flights to California (Ca) which hub through Los Angeles, the flight database may be reduced to three subprefixes: USxx, USBox and USCax. If a search were made for flights to Fresno (Fr), a search for USCaFr would find no exact match, but instead would locate common subprefixes USxx and USCax. The present invention will return the longest matching subprefix USCax, so that flight data for all California destination cities, including Fresno, is obtained.

A prefix search tree is created in accordance with certain principles of the binary search tree described in our aforementioned application. The prefix search tree contains prefixes of addresses in the binary search tree. A binary search prefix is input to the tree to identify a match to a longest prefix portion (herein a "subprefix") in the tree. More particularly, a search mask is created during the search process identifying each subprefix in the search prefix that matches a subprefix in one or more prefixes in the tree. A bit string from the search prefix that corresponds to the longest matching subprefix (which may be a complete key if the entirety of the search prefix matches a tree key) is used to locate and output data. Thus, if the bit string of the search prefix exactly matches a key in a bottom vertex (e.g., USCaFr in the above example), data associated with the key in the bottom vertex is output. If the bit string of the search prefix is a longest matching subprefix (e.g., USCax in the example), that subprefix is reentered into the search tree to locate data associated with the subprefix (e.g., flight data for all California destination cities).

In the present invention, the prefixes are equal in length, W. Where a prefix is otherwise shorted, the less significant bit positions are empty ("x"), that is, neither "0" nor "1". Thus, in the context of the present invention, a bit may have one of three values, namely "0", "1" and "x". The prefixes thus formed have values based on two rules: First, a bit string A is smaller in value than a bit string AB (AB>A), where the bit string B is not empty (i.e., contains at least-one finite bit). Thus, if A is "1101" and B is "110", AB is "1101110" and 1101110>1101. Second, a bit string A1B comprising bit string A followed by binary "1" and a bit string B is greater in value than the same bit string A followed by binary "0" and bit string C, regardless of whether either or both of bit strings B and C are empty. Thus, A1B>A0C. Thus if A is "1101", B is "000", and C is "110", A1B is "11011000" and A0C is "11010110" and 11011000>11010110. Even if B is empty (i.e., "xxx", where "x" designates an empty bit), A1B is greater than A0C (11011xxx>11010110). It should be noted that A may be empty under either of the above rules.

1.0 Tree Description

In our aforementioned application, we describe a binary search tree containing a plurality of hierarchy search vertices or nodes and a plurality of bottom search vertices or leaves. Each bottom vertex contains entries in the form of keys and associated data. The keys may be URL addresses. The prefixes in the bottom vertices are arranged in an order, such as by address value, such that the values of all of the keys of one bottom vertex are higher than the values of all keys of lower-ordered bottom vertices and lower than all of the keys of higher-ordered bottom vertices. Thus, all of the keys in bottom vertex X are higher than those in vertices 0 to X−1 and are lower than those in vertices X+1 to V (0>X>V), where V is the total number of bottom vertices. Each hierarchy vertex contains the lowest valued key of each child vertex, with the hierarchy vertices of each level serving as parent to groups of child vertices arranged by the order of the keys contained therein. Thus, the hierarchy vertices are also arranged in an order, based on the key order. The result is a structured search tree in which any given vertex of a given level contains keys that are arranged in an order.

FIG. 1 illustrates a binary search tree in accordance with the present invention and structured as described in our aforementioned application. The tree includes a root vertex or node 260 and a plurality of hierarchy vertices or nodes 226, 224 and 225 arranged in a plurality of levels L0, L1 and L2. A fourth level, L3, contains a plurality of bottom vertices or leaves 220, 221, 222 and 223. While the search tree illustrated in FIG. 1 employs four levels, any number of levels may be employed, limited solely by the capacity of the memory in which the tree is stored. Increasing the number of levels increases the number of vertices in each path from the root vertex to each bottom vertex, and increases the capacity of the tree and the search time. The vertices of level L3 are children to the vertices of level L2, which in turn are children to the vertices of level L1, which in turn is a child to root vertex 260 at level L0. Root vertex 260 is the entry point for searches to the tree.

Each hierarchy vertex 224–226 includes a plurality of entries 36. Root vertex 260 is a virtual vertex that has a single entry 36. Each entry 36 has an entry address 38 indicating its location in the root vertex, and includes a prefix 227–233, a child vertex address field 42, and a designator field 44. The prefix is a prefix of an address and is the same prefix as in a child vertex. Hence, prefix "0011" in vertex 226 also appears in vertex 225, which in turn is also in vertex 222. The prefix in a root or hierarchy vertex is a minimum-ordered prefix in the respective child vertex. The entry address 38 is the address in the vertex for the entry 36 containing the prefix. Hence, entry address "1" in vertex 226 is the address for prefix "0011". The child vertex address 42 is the address of a child vertex in the next subordinate level. Thus, address "1" in field 42 is the address of child vertex 225 containing prefix "0011". The designator 44 designates the number of entries or prefixes in the child vertex. Thus, "2" at field 44 in vertex 226 indicates that child vertex 225 has two entries 36.

Each bottom vertex in level L3 includes a plurality of entries 46 located at respective entry addresses 36 within the bottom vertex. Each entry 46 includes a prefix field containing a prefix 212–219 and a corresponding data field 50. The prefix is the key or address of the corresponding data in field 50. The entry address 36 is the address in the bottom vertex for the prefix. Hence, entry address "1" in vertex 220 is the address for prefix "ooxx" and its associated data "Y".

Each hierarchy and bottom vertex, namely the vertices in levels L1, L2 and L3 in the example, has a vertex address 52 identifying its location in memory. The vertex address for each vertex is unique for the level, and is copied into field 42 of the parent vertex. Hence, vertex address "0" associated with vertex 220 appears in field 42 of the appropriate entry in parent vertex 224. The number of entries in the respective vertex appears in field 44 of the parent vertex. Thus, designator "2" in field 44 of the associated entry in vertex 224 indicates that child vertex 220 contains two entries. Root vertex 260 in level L0 is the entry vertex and does not require an address or a designator indicating the number of entries in the vertex.

The number of entries in any hierarchy or bottom vertex is limited to between k and 2k−1, that is, the number of entries (prefixes) is equal to or greater than k and equal to or smaller than 2k−1. The value of k is any integer greater than or equal to 2 ($k \geq 2$), although for purposes of explanation, the tree will be described where k=2, so that each hierarchy and bottom vertex in the example has 2 (k) or 3 (2k−1) entries. It will be appreciated that the value of k may be greater than 2. Thus, if k=3, the minimum number of entries in a vertex is 3 and the maximum is 5. Moreover, while the value of k is the same for all vertices of a given level, the value of k may be different for vertices of different levels.

The prefixes 50 in bottom vertices 220–223 are shown in an ascending order from left to right across FIG. 1 such that the prefix with the lowest address (e.g., "0xxx") appears in bottom vertex 220 and the prefix with the highest address (e.g., "1101") appears in bottom vertex 223. Noteworthy, however, the addresses of the vertices need not be in the same ascending order. Instead, the bottom vertices are arranged in an order ascending from one to V, equal to the number of bottom vertices. In the example, V=4, since there are four vertices in level L3. The entries in the bottom vertices are arranged among the bottom vertices so that the prefix values of all entries in any one bottom vertex are greater than the prefix values all lower-ordered bottom vertices and are smaller than the prefix values in all higher-ordered bottom vertices. For example, the prefixes of vertex 221 are all higher than the prefixes in vertex 220, and are lower than the prefixes in vertices 222 and 223, notwithstanding that vertex 221 has an address higher than either of vertices 222 and 223. The only condition on the prefix values is that they ascend through each vertex. It is not necessary that the vertices be arranged in address order for the ascending prefixes. Thus, as shown at level L3, the prefixes ascend through the bottom vertices whose addresses are 0, 4, 2 and 1. Thus, the address of vertex 34 containing the highest prefix address ("1101") is "1" which is actually lower than the address of other vertices of level L3 containing lower prefix addresses. The addresses of the hierarchy vertices also do not need to be in address order for ascending prefixes. Also, the actual prefix addresses given in the example are arbitrary and may be any prefix addresses as may be appropriate.

Each prefix is associated with data such that a search for a prefix, which is a designating address, will retrieve the associated data. Thus, a search for prefix "0111" will retrieve data R from vertex 223 whereas a search for prefix "0001" will retrieve data U from vertex 221.

Each parent vertex 260, 224 and 225 contains entries 36 identifying the lowest value prefix in its child vertices. Thus, vertex 260 contains a single entry (because it has a single child vertex 226) identifying the lowest value prefix, which is "0xxx". Vertex 226 contains two entries (because it has two child vertices 224 and 225). Each entry in vertex 226 includes the prefix value of the lowest value prefix in each respective child vertex. Similarly, vertex 224 contains the prefixes of the lowest value prefix in each bottom vertices 220 and 221, and vertex 225. contains the refixes of the lowest value prefix in each bottom vertices 222 and 223. Thus, each hierarchy vertex of levels L1 and L2 contains prefixes that are the same as the lowest value prefix in the child vertex of the next lower level of the respective path. The child vertex is identified by the child vertex address in field 42 of the corresponding entry. The hierarchy vertices of each level L1 and L2 are arranged in an ascending order such that the prefix values of all entries in any one hierarchy vertex of a level are greater than the prefix values in all lower-ordered hierarchy vertices of the same level and are smaller than the prefix values in all hierarchy higher ordered vertices of the same level. For example, the prefixes of vertex 225 are all higher than the prefixes in vertex 224. Moreover, the ordering of the prefixes is without regard to the addresses of the vertices of the level. Nevertheless, an inspection of the tree of FIG. 1 reveals that the group of bottom vertices containing the lowest prefixes (vertices 220 and 221) are children of the vertex (224) having the lowest prefixes. Moreover, as in the case of the bottom vertices, the ordering of prefixes in the hierarchy vertices is without regard to the vertices' addresses.

Those skilled in the art will appreciate that the tree illustrated in FIG. 1 is not a representation of a physical relationship of the memory elements containing the prefixes, data and other information identified in FIG. 1. Instead, FIG. 1 identifies the relationship of these elements that are stored in the computer memory, without regard to the physical position of those elements.

In the example of FIG. 1, the prefixes comprise bit strings having four bit positions, although in practice the bit strings are much longer, 32 or even 128 bits being common. In those cases where bits are masked from the associated prefix, the prefix contains empty bits at the least significant bit positions. Hence, prefixes 212 and 213 ("0xxx" and "00xx") have empty bit positions designated by "x", where "x" is an empty bit.

A mask 240–253 is associated with each prefix 212–219 and 227–232 in each hierarchy and bottom vertex. The construction and purpose of masks 240–253 is explained in Sections 2.0 and 3.0. Suffice it to say, each mask has the same length W as the prefixes. In the example of FIG. 1, the length of the prefixes is four bits (W=4). Therefore, the prefixes and masks in the example are each four bits.

FIG. 1 also illustrates a root vertex 260 containing a single entry of the lowest-ordered prefix in the tree. The root vertex contains no prefix of that prefix, nor mask associated with a prefix.

2.0 Prefix Masks

Prefix masks 240–253 are used for searching, and are constructed during insertion and deletion operations described below. The prefix masks 240–253 are based on subprefixes to keys in the bottom vertices. Initially, the tree contains a single entry 231, 0xxx, and the corresponding mask 252 is "1000". All other masks are initialized to zero, so all masks 240–251 and 253 contain only a string of binary "0s". As entries are added to or deleted from the tree, the masks are edited as described in sections 4.0 and 5.0. Each mask identifies a subprefix of length i of the prefix in the vertex. The state of a mask for a given prefix in a given vertex may be described as follows, where L is the length, in number of bits, of the prefix:

1) if i>L, the i-th mask bit is "0"
2) if subprefix(i) is a key appearing in an entry in a bottom vertex and is not a subprefix of an entry in the parent vertex, then the i-th bit is "1"
3) if subprefix(i) is an entry in the parent vertex, then the i-th bit is "0".

Condition (1) merely states that a subprefix is shorter than a prefix containing the subprefix. Condition (2) states that if a subprefix of length i matches a key in a bottom vertex (and does not appear in the parent vertex), the i-th bit is a "1". Thus, prefix 231 ("0xxx") in vertex 226 is an exact match of key 212 in vertex 220, so the i-th bit in mask 252 (namely, the most significant bit) is a "1". In vertices 224 and 220, the corresponding bits in masks 248 and 240 are "0" because the subprefix "0xxx" appears in the parent vertex 226 or 224, respectively.

Similarly, the subprefix "0xxx" of entry 232 in vertex 226 ("0011" ) matches key 212 in vertex 220, so the first bit of mask 253 is a "1". Likewise, prefix "00xx" of entry 232 matches key 213 in vertex 220, so the second bit of mask 253 is a "1". Subprefix "001x" of entry 232 has no match in the bottom vertices, so the third bit of mask 253 is "0". Subprefix "0011" of entry 232 matches key 216 in vertex 222, so the fourth bit of mask 253 is "1".

3.0 Searching

The present invention is carried out by a computer system having a computer readable storage medium, such as a hard disk drive. A computer readable program code is embedded in the medium and contains instructions that cause the computer to define and carry out the functions of the tree, including search, insert and delete functions.

The binary search tree of FIG. 1 is employed in a search for data associated with a prefix. The search is performed by inputting a search prefix S1 to root vertex 260. At each vertex, the prefix search process compares the search prefix S1 to the prefixes in the vertex and creates a search mask associated with the input prefix. The search mask contains a "1" bit based on each subprefix found in the search tree that matches a subprefix in the search prefix. More particularly, a "1" bit is set in the search mask at each vertex based on the longest matching subprefix in that vertex. The bits set in the vertices are accumulated in the search such that the "1" bit at the lowest bit position in the completed search mask identifies the longest length of a subprefix in the search prefix that matches a subprefix (or prefix) in the collection of the tree. If the lowest position "1" bit is in the least significant position of the search mask, the search prefix exactly matches a key associated with data in the tree. The computer returns a true indication that the matching key has been found, and the data in the bottom vertex associated with the key is output. If the lowest position "1" bit is not in the least significant position of the search mask, (i.e., the least significant bit position in the search mask is a "0"), the search prefix does not exactly match a key in the tree. Instead, the computer returns a false indication that the sought-for prefix is not in the tree, as well as the subprefix that matches a key in the tree. The matching subprefix is re-input to the search tree to output the data associated with the key that matches the subprefix.

The instructions to the computer to perform a prefix search define a comparison operation COMP(S1,S2) that compares the search prefix (S1) to ach prefix (S2) at each vertex. The result is a special mask ME(eq_width(S1,S2)) having "1" bits defining k upper bits equal to the length of the maximum common prefix of S1 and S2 and P-k lower bits all equal "0". This special mask is then compared to the prefix mask associated with the prefix under consideration to define the search mask, M(S):

M(S)=M(S) OR (mask[S2] AND COMP(S1,S2)).

The last "1" bit of the search mask defines the position of the longest prefix of the search prefix, S1, in the collection. If the last "1" bit is also the least significant bit in the search mask, which occurs only if the search prefix exactly matches a prefix in the tree, the computer also returns the data associated with the prefix.

FIG. 2 is a flow diagram of the process of constructing the search mask and may be described with reference to FIG. 1. A search prefix S1 is input to root vertex 260 at step 400 steps immediately to vertex 226 (because vertex 260 is a virtual vertex that has no prefix mask). At step 402 the search prefix is compared to the prefixes in vertex 226 to set a bit in a special mask. For example, if search prefix "0110" is input to root vertex 260, the search prefix "0110" is compared to the prefixes in vertex 226 ("0xxx" and "0011") to identify a common "0" at the most significant position. Thus, a comparison of "0110" and "0xxx" reveals a common "0" at the most significant bit. Consequently, a first special mask "1000" is created from this comparison. Likewise, a comparison of "0110" and "0011" reveals a common "0" at the most significant bit. Thus, a second special mask "1000" is created from this comparison.

For each prefix, the search mask M(S) may be modified by setting a bit based on a comparison of the prefix mask (e.g., mask 252 and 253) to the corresponding special mask (e.g., "1000" and "1000", respectively. Thus, at step 404 a comparison of prefix mask 252 ("1000") and the special mask ("1000") indicates a common binary "1" at the most significant bit position. Consequently, the search mask, M(S), ("0000") is modified by inserting a "1" bit into the position corresponding to the comparison. Thus, the search mask is "1000". A similar comparison is made between prefix mask 253 ("1101") and the corresponding special mask ("1000"), also resulting in a search mask of "1000".

The generation of search mask M(S) is performed by a Boolean AND and OR operations between the special mask and the corresponding prefix mask. Thus, 1000 AND 1000= 1000 and 1000 AND 1101=1000. The result is OR'd with the existing search mask (0000) resulting in the search mask "1000" (0000 OR 1000 OR 1000=1000).

At step 406, a determination is made that the search mask is not complete. More particularly, since the least significant bit in the search mask is a "0" and a search has not been made of a bottom vertex, the mask is determined as not completed. Consequently, the process is advanced at step 408 to the appropriate child vertex in the next level and the process loops back to step 402. More particularly, since the search prefix "0110" is greater than prefix 232 ("0011"), field 42 associated with prefix "0011" in vertex 226 "points" to address "1" of vertex 225. Consequently, the process loops back to step 402 for vertex 225.

At vertex 225, the comparison of the search prefix ("0110") and the tree prefix ("0011") reveals a single common "0" at the most significant bit position. Consequently, the special mask is "1000". Similarly, the comparison of the search prefix ("0110") to the tree prefix ("0111") reveals three bits of comparison, creating a special mask of "1110". At step 404, comparison of the special masks to the respective prefix masks generates bit strings of 0000 and 0000, respectively (1000 AND 0000=0000 and 1110 AND 0001= 0000) resulting in a special mask of "1000" (1000 OR 0000 OR 0000=1000). The bits at the fourth position do not match, so field 42 in vertex 225 points to vertex 222, so the process loops back to step 402 for vertex 222. Since the search prefix "0110" is greater than prefix 229 ("0011") and smaller than prefix 230 ("0111"), field 42 associated with prefix "0011" in vertex 225 "points" to address "2" of vertex 222. Consequently, the process loops back to step 402 for vertex 222.

At vertex 222, a comparison of search prefix "0110" to prefix 216 ("0011") creates a special mask of "1000". However, all four bits of the search prefix "0110" match the bits of prefix 217. Consequently, a special mask of "1111" is created. Comparing the special mask "1000" to the corresponding prefix mask "0000", the search mask is unchanged at "1000". Comparing the special mask "1111" to the corresponding prefix mask (0001) results in a binary string "0001" which, when OR'd with the existing search mask provides a search mask of "1001".

Since the search mask is now determined to be completed, the process continues from step 406 to step 410 where a determination is made as to whether an exact match was made to a prefix in the tree. The "1" bit in the fourth or least significant position of the search mask indicates that search prefix S1 matches a prefix in the collection. Consequently, at step 410 a "true" (yes) return is made indicating that the matching prefix was found, and the data associated with the search prefix is output at step 412.

Had the prefix not been found, the prefix tree would return a "false" (no) return at step 410 indicating that a prefix matching the search prefix was not found. Nevertheless, the search mask is used at step 414 to mask the search prefix to the longest matching subprefix and the subprefix is output at step 416 to the root vertex of the binary search tree at step 400. For example, if the search prefix had been "0101", the search mask would be created through vertices 226 and 225 as described above to "1000". Since no match occurs at a bottom vertex, the search mask completed at step 406 is "1000". The "0" in the least significant bit position in the search mask indicates the collection does not contain perfect match to the search prefix "0101". The least significant "1" bit in the completed search mask is used at step 414 to mask off all bits from the search prefix in positions less significant than the "1" bit in the mask, resulting in a matching subprefix "0xxx". The computer returns a "false" indication that the full search prefix was not found. Nevertheless, but subprefix "0xxx" is output at step 416 to the root vertex 260 of the binary search tree to loop back to step 400 to locate associated data. In this case, the binary search will return data Z associated with the longest matching subprefix "0xxx".

4.0 Deleting Prefixes

When a prefix is inserted or deleted into one of the bottom vertices, the table of FIG. 1 may need to be adjusted. Adjustment of the table is accomplished in the memory containing the table.

As described in greater detail in our aforementioned application, if a prefix is to be deleted from a bottom vertex containing more than k prefixes (k being the minimum number of prefixes permitted in a vertex), a simple process of prefix deletion involves simply deleting the prefix and its associated data, and re-designating any lower-level prefix into a higher address. Some adjustment may be necessary in the hierarchy vertices if the smallest value prefix of a bottom vertex is changed. Also, fields in the hierarchy vertices may need to be adjusted to reflect the correct addresses of the re-structured tree.

In some cases a bottom vertex may be completely deleted due to deleting a single entry. As described in our aforementioned application, if deletion of a prefix would reduce the number of entries in the vertex to less than k, the prefix(s) remaining in the vertex is/are transferred to another vertex, and the parent of the vertices affected are adjusted to reflect the correct number of child vertices. Thus, if k=2, the removal of an entry from a vertex containing only two entries will result in the remaining prefix being joined to a neighboring vertex and deletion of the affected vertex.

If the neighboring vertex already has the maximum number of entries (2k−1) such that it cannot accept an additional entry from the vertex containing the deleted prefix, a prefix entry may be transferred from the neighboring vertex to increase the original vertex back to k (e.g., 2) and decrease the entries in the neighboring vertex to 2k−2 (e.g., 2). Again, as explained in our aforementioned application, adjustment of various fields in the affected vertices, including their parent vertices, may be necessary.

Deleting a prefix may require adjustment of the prefix masks 240–253. For example a new prefix array is generated upon transferring prefixes between vertices in a given level, such as by joining neighboring vertices. Starting from the vertex containing the smallest valued prefix K, if M(K) is the mask stored in the parent vertex of the joined lower vertices, for each valid index i, do mask[i]=mask[i] OR M(K) AND COMP(K,key[i]).

Thus mask M(K) accumulates the prefixes for key K.

The deleted prefix is removed from the tree, together with its data. After the first stage mask M(K) is stored for each valid index i of the current vertex, do mask[i]=mask[i] OR M(K) AND COMP(K,key[i])

When mask[i] is completed for all indices, for each valid index do

M(K)=M(K) AND (NOT COMP(K,key[i])).

5.0 Inserting Prefixes

A prefix IK and its corresponding data ID are inserted into the tree of FIG. 1 by conducting a search, as described above, for the prefix IK. If it is found, the data ID is inserted into the corresponding entry for prefix IK in the corresponding bottom vertex and the process ends. If the prefix is not found, a process for inserting prefix is initiated. As described in our aforementioned application, in the simple case where the addition of the prefix to a bottom vertex does not exceed the 2k−1 entry limit, the prefix and data are simply added, and the fields for the number of entries in the bottom and the immediate parent vertices are adjusted. As explained in our aforementioned application, entry of a prefix is not made (at least initially) to a lowest valued position in a vertex, so in the simple case no adjustment of the parent vertices is required, other than the field identifying the number of entries.

A more complex situation occurs where the prefix insertion is to a vertex that already contains a maximum number of entries. In that case, new vertices may need to be created, and the tree re-structured to accommodate the new prefix, all as described in our aforementioned application.

If the new prefix is being inserted in the structured search tree, for each valid index i a mask is created in the prefix tree M(S)=M(S) OR mask[i] AND COMP(S,key[i]), where M(S) is the mask for the prefix for the new key. If the bottom vertex is being split, as described above in Section 5.1, the masks of both the old and new vertices are modified. The minimum valued prefix of the new vertex is set to K and mask M(K) is initialize to zero. For each valid index i before splitting, do M(K)=M(K) OR mask[i] AND COMP(K,key[i])

mask[i]=mask[i] OR M(K) AND (NOT COMP(K,key[i]))

Mask M(K) and prefix K are sent to the next upper level hierarchy vertex. If the prefix K is to be inserted into the hierarchy vertex, for each valid index i before insertion of prefix K, do M(K)=M(K) OR mask[i] AND COMP(K,key[i])

mask[i]=mask[i] OR M(K) AND COMP(K,key[i])

The present invention thus provides a prefix tree that constructs a search mask based on an input search prefix and the subprefixes of prefixes in the prefix tree. The least significant set bit (i.e., "1" bit) in the mask defines the longest matching subprefix of the collection. Moreover, the state of the least significant bit in the mask identifies whether the output subprefix is a complete prefix or a subprefix. Thus, if the least significant bit in the search mask is set to a "1", the output subprefix is a complete prefix; if the least significant bit in the search mask is a "0", the output subprefix matches one or more subprefixes of prefixes in the tree. The invention also provides an effective technique for deleting and inserting new prefixes into the tree.

The invention is carried out in a computer, with a memory medium, such as a recording disk of a disk drive, having a computer readable program therein containing computer readable program code that defines the prefix and search trees and carries out the computer processes of the invention.

The present invention thus provides an effective prefix structure by which prefixes can be searched entirely within the prefix tree without resort to external prefix sorting. All prefixes in the prefix tree are equal in length, thereby minimizing worst-case delay due to variable length prefixes. Consequently, search delays are fully predictable.

Although the present invention has been described with reference to preferred embodiments, workers skilled in the art will recognize that changes may be made in form and detail without departing from the spirit and scope of the invention.

What is claimed is:

1. A process for selecting a subprefix having a longest match to a search prefix, comprising steps of:
   a) providing a search tree containing a plurality of vertices arranged in a plurality of levels such that a bottom level contains a plurality of bottom vertices each containing a plurality of prefixes, a top level contains a root vertex defining an input to the tree, and at least one intermediate level contains a plurality of hierarchy vertices, each hierarchy vertex having a plurality of child vertices in a next lower level and each bottom vertex being a child to a respective hierarchy vertex in a lowest intermediate level, each hierarchy vertex defining at least a portion of a path that extends through the respective level between the root vertex and a bottom vertex, each hierarchy vertex containing a prefix from a plurality of respective child vertices;
   b) input a search prefix into the root vertex;
   c) comparing the search prefix to the prefixes in a selected vertex of a hierarchy level;
   d) setting a bit in a search mask based on a least significant bit of a bit string in the search prefix that matches a longest bit string in a prefix in the selected vertex;
   e) repeating steps (c) and (d) for at least one vertex of each remaining hierarchy and bottom level; and
   f) selecting the longest matching subprefix.

2. The process of claim 1 wherein step (f) is performed by selecting a string of most significant bits of the search prefix based on the lowest significant bit set in the search mask.

3. The process of claim 1, wherein each of the prefixes has the same the number of bit positions, and the number of bit positions in the search mask is equal to the number of bit positions in each of the prefixes, and wherein step (f) further includes steps of:
   f1) identifying whether the longest matching subprefix has the same number of bit positions as the search mask, and
   f2) adding least significant empty bits to the longest matching subprefix if the number of bits in the longest matching subprefix is less than the number of bit positions in the search mask.

4. The process of claim 1, wherein each of the prefixes has the same the number of bit positions, and the number of bit positions in the search mask is equal to the number of bit positions in each of the prefixes, and wherein the process further includes:
   g) returning a status condition based on the value of the least significant bit in the search mask.

5. The process of claim 1, wherein each bottom vertex contains entries comprising the binary prefixes and associated data, and the prefixes of each level are in a predetermined order, the process further including steps of:
   g) output the data associated with the prefix matching the longest matching subprefix.

6. The process of claim 5, wherein each of the prefixes has a predetermined number of bit positions, and wherein step (f) further includes steps of:

f1) identifying whether the number of binary bits in the longest matching subprefix equals the predetermined number of bit positions, and f2) adding least significant empty bits to the longest matching subprefix if the number of binary bits in the longest matching subprefix is less than the predetermined number.

7. The process of claim 6, further including the step of h) returning a status condition based on the least significant bit in the longest matching subprefix.

8. The process of claim 6, wherein step (g) includes identifying whether the longest matching subprefix perfectly matches a prefix, and further comprises steps of:

g1) if the longest matching subprefix perfectly matches a prefix, output data associated with the matching prefix, or g2) if the longest matching subprefix does not perfectly match a prefix, input the longest matching into the root vertex as the search prefix and repeating steps (c)–(g1).

9. The process of claim 1, wherein the search tree further includes a prefix mask for each prefix in each vertex based on a value of the prefix and a value of each prefix in descendent vertices, and wherein step (c) comprises steps of:

c1) comparing bits of the search prefix to bits of the selected prefix to identify identical most significant binary bit streams, and c2) setting a bit having a predetermined value in a special mask, the position of the set bit being representative of the length of the identical bit streams, and step (d) comprises steps of:

d1) comparing the prefix mask and the special mask to identify common bit positions having the predetermined value, and d2) creating a search mask based on the identified bit positions.

10. The process of claim 1, wherein the search tree further includes a prefix mask for each prefix in each vertex based on a value of the prefix and a value of each prefix in descendent vertices, and wherein step (c) comprises c1) performing a Boolean AND operation on the search prefix and the selected prefix to form a special mask, and step (d) comprises steps of:

d1) performing a Boolean AND operation with the prefix mask and the special mask, and d2) performing a Boolean OR operation using the results of step (c1) for each prefix in the vertex to form a search mask.

11. The process of claim 10, wherein step (d2) includes performing the Boolean OR operation using a search mask created in a previous vertex.

12. A process of generating prefix masks for each prefix in a search tree containing a plurality of vertices arranged in a plurality of levels such that a bottom level contains a plurality of bottom vertices each containing a plurality of prefixes, a top level contains a root vertex defining an input to the tree, and at least one intermediate level contains a plurality of hierarchy vertices, each hierarchy vertex having a plurality of child vertices in a next lower level and each bottom vertex being a child to a respective hierarchy vertex in a lowest intermediate level, each hierarchy vertex defining at least a portion of a path that extends through the respective level between the root vertex and a bottom vertex, each hierarchy vertex containing a prefix from each of a plurality of respective bottom vertices, each prefix comprising a bit stream, the process comprising steps of:

a) initializing a prefix mask for a prefix in a hierarchy vertex so that all bits have a first value;

b) comparing the bit stream of a prefix in a hierarchy vertex to the bit stream of each prefix in descendent vertices; and c) setting a bit in the prefix mask to a second value at each bit position corresponding to matching bits in the compared bit streams;

d) repeating steps (b) and (c) for each prefix in each vertex in the level.

13. The process of claim 12, further including, at each lower level, e) repeating step (b), f) setting a bit in the prefix mask to the second value at each bit position less significant than set in step (c) in a parent vertex that corresponds to matching bits in the compared bit streams, and g) repeating steps (e) and (f) for each prefix in each vertex in each lower level.

14. A computer useable medium having a computer readable program embodied therein for addressing data, the computer readable program comprising:

computer readable program code defining a search tree containing a plurality of vertices arranged in a plurality of levels such that a bottom level contains a plurality of bottom vertices each containing a plurality of prefixes, a top level contains a root vertex defining an input to the tree, and at least one intermediate level contains a plurality of hierarchy vertices, each hierarchy vertex having a plurality of child vertices in a next lower level and each bottom vertex being a child vertex to a respective hierarchy vertex in a lowest intermediate level, each hierarchy vertex defining at least a portion of a path that extends through the respective level between the root vertex and a bottom vertex, each hierarchy vertex containing a prefix from a plurality of respective bottom vertices;

computer readable program code for causing a computer to iteratively, through the hierarchy and bottom levels, compare a search prefix that is input to the root vertex to the prefixes in a selected vertex in each level and set a bit in a search mask based on a least significant bit of a bit string in the search prefix that matches a longest bit string in a prefix in the selected vertex; and computer readable program code for causing the computer to select, as a longest matching subprefix, a string of most significant bits of the search prefix based on the lowest significant bit set in the search mask.

15. The computer useable medium of claim 14, including:

computer readable program code for causing a computer to identify whether the longest matching subprefix has the same number of bit positions as the search mask, and computer readable program code for causing a computer to add least significant empty bits to the longest matching subprefix if the number of bits in the longest matching subprefix is less than the number of bit positions in the search mask.

16. The computer useable medium of claim 14, wherein the computer readable program code defining the search tree also defines a prefix mask for each prefix in each vertex based on a value of the prefix and a value of each prefix in descendent vertices and the computer readable program code for causing the computer to set a bit in a search mask includes > computer readable program code for causing the computer to perform a Boolean AND operation on the search prefix, the selected prefix, and the prefix mask, and
>
> computer readable program code for causing the computer to perform a Boolean OR operation using the results of the Boolean AND operation for each prefix in the vertex to form a search mask.

17. The computer useable medium of claim 16, wherein computer readable program code for causing the computer to set a bit in a search mask further includes > computer readable program code for causing the computer to initialize the search mask, and the computer readable program code for causing the computer to perform a Boolean OR operation further includes > computer readable program code for causing the computer to perform the Boolean OR operation using the search mask.

18. The computer useable medium of claim 14, wherein the computer readable program code defining the search tree also includes > computer readable program code that causes the computer to arrange the bottom search vertices in an order ascending from one to V, where V is an integer equal to the number of bottom search vertices,
>
> computer readable program code that causes the computer to arrange the prefixes in the bottom search vertices so that values of the prefixes in any one bottom search vertex are greater than values of the prefixes in all lower-ordered bottom search vertices and are smaller than values of prefixes in all higher-ordered bottom search vertices,
>
> computer readable program code that causes the computer to enter a prefix in each hierarchy vertex that is the same as the prefix having a minimum value in each child vertex, and
>
> computer readable program code that causes the computer to arrange the hierarchy vertices of each level in an ascending order so that the prefix values in any one hierarchy vertex of a level are greater than the prefix values in all lower-ordered hierarchy vertices of the level and are smaller than the prefix values in all higher-ordered hierarchy vertices of the level.

19. The computer useable medium of claim 14, wherein the computer readable program code defining the search tree also defines a prefix mask for each prefix in each vertex based on a value of the prefix and a value of each prefix in descendent vertices and the computer readable program code for causing the computer to set a bit in a search mask includes > computer readable program code for causing the computer to compare bits of the search prefix to bits of the selected prefix to identify identical most significant binary bit streams, and
>
> computer readable program code for causing the computer to set a bit having a predetermined value in a special mask, the position of the set bit being representative of the length of the identical bit streams,
>
> computer readable program code for causing the computer to compare the prefix mask and the special mask to identify common bit positions having the predetermined value, and
>
> computer readable program code for causing the computer to create a search mask based on the identified bit positions.

20. The computer useable medium of claim 14, wherein the computer readable program code defining the search tree also includes > computer readable program code for causing the computer to initialize a prefix mask for a prefix in a hierarchy vertex so that all bits have a first value,
>
> computer readable program code for causing the computer to iteratively compare the bit stream of prefixes in hierarchy vertices to the bit stream of each prefix in respective descendent vertices, and
>
> computer readable program code for causing the computer to set a bit in the prefix mask to a second value at each bit position corresponding to matching bits in the compared bit streams.

* * * * *